United States Patent
Huber et al.

(10) Patent No.: US 11,776,238 B2
(45) Date of Patent: Oct. 3, 2023

(54) EXPLOITING CAMERA ROLLING SHUTTER TO DETECT HIGH FREQUENCY SIGNALS

(71) Applicant: The Government of the United States of America, as represented by the Secretary of the Navy, Arlington, VA (US)

(72) Inventors: David Huber, Jessup, MD (US); Lena Franklin, Rockville, MD (US); Jake Griffiths, Sykesville, MD (US); William Scharpf, Huntingtown, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 164 days.

(21) Appl. No.: 17/468,616

(22) Filed: Sep. 7, 2021

(65) Prior Publication Data
US 2022/0076046 A1    Mar. 10, 2022

Related U.S. Application Data

(60) Provisional application No. 63/074,963, filed on Sep. 4, 2020.

(51) Int. Cl.
| G06V 10/75 | (2022.01) |
| H04N 25/531 | (2023.01) |
| G06T 7/262 | (2017.01) |
| G06V 10/50 | (2022.01) |

(52) U.S. Cl.
CPC ............ *G06V 10/50* (2022.01); *G06V 10/751* (2022.01); *G06T 7/262* (2017.01); *H04N 25/531* (2023.01)

(58) Field of Classification Search
CPC .... G06V 10/50; G06V 10/751; H04N 25/531; G06T 7/262
See application file for complete search history.

(56) References Cited

U.S. PATENT DOCUMENTS

| 2012/0320232 A1* | 12/2012 | Trumbo | ............... H04N 25/583 348/226.1 |
| 2018/0205922 A1* | 7/2018 | Wu | ........................ G11B 27/28 |

OTHER PUBLICATIONS

Vanderplas, J.T., "Understanding the Lomb-Scargle Periodogram," The Astrophysical Journal Supplement Series, 2018, 236:16, pp. 1-28. (Year: 2018).*
Su, H., Hajj-Ahmad, A . . . , Garg, R., Wu, M., "Exploiting rolling shutter for ENF signal extraction from video," 2014 IEEE International Conference on Image Processing (ICIP), Paris, France, 2014, pp. 5367-5371, doi: 10.1109/ICIP.2014.7026086. (Year: 2014).*

(Continued)

*Primary Examiner* — Siamak Harandi
*Assistant Examiner* — Daniella M. DiGuglielmo
(74) *Attorney, Agent, or Firm* — US Naval Research Laboratory; Jorie L. Stroup

(57) ABSTRACT

A method of extracting high-frequency temporal information from images or video recorded with a rolling shutter-based imager includes the steps of acquiring image data using the rolling shutter-based imager; and extracting time-domain frequency information from the image data based on two or more lines of pixels in the image data.

8 Claims, 1 Drawing Sheet

(56) References Cited

OTHER PUBLICATIONS

Vatansever, S., Dirik, A.E., Memon, N., "Analysis Rolling Shutter Effect on ENF based Video Forensics," arXiv, 2019, pp. 1-14. (Year: 2019).*

Choi, J., Wong, C.-W., "ENF Signal Extraction for Rolling-shutter Videos Using Periodic Zero-padding," ICASSP 2019—2019 IEEE International Conference on Acoustics, Speech and Signal Processing (ICASSP), Brighton, UK, 2019, pp. 2667-2671, doi: 10.1109/ICASSP.2019.8682894. (Year: 2019).*

Lena Franklin, David Huber, "Exploiting camera rolling shutter to detect high frequency signals," Proc. SPIE 11137, Applications of Digital Image Processing XLII, 111370H (Sep. 6, 2019); https://doi.org/10.1117/12.2529458 (Year: 2019).*

\* cited by examiner

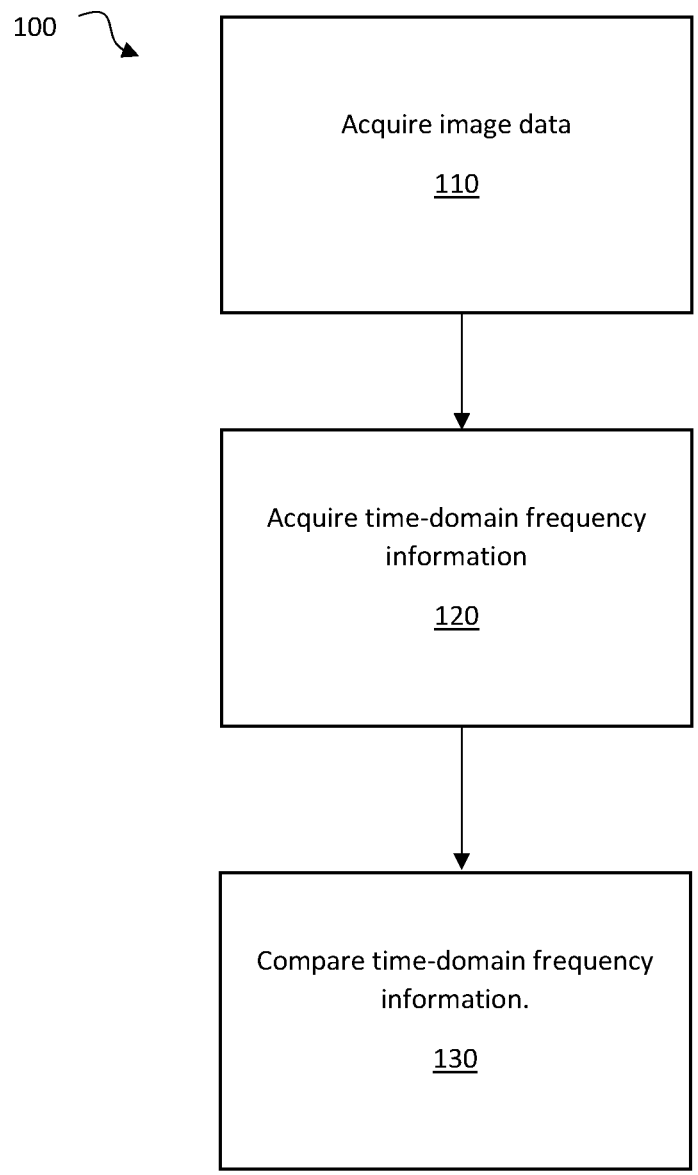

EXPLOITING CAMERA ROLLING SHUTTER TO DETECT HIGH FREQUENCY SIGNALS

RELATED APPLICATIONS

This application claims the benefit of U.S. Provisional Application No. 63/074,963 filed Sep. 4, 2020, which is hereby incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, D.C. 20375, USA; +1.202.767.7230; techtran@nrl.navy.mil, referencing NC 113004.

FIELD OF INVENTION

The present invention relates generally to time-based frequency analysis of images, and more particularly to a method of detecting frequencies far in excess of a frame-rate of a rolling-shutter camera.

BACKGROUND

Imaging sensors are ubiquitous in society due to inexpensive Complementary Metal-Oxide-Semiconductor (CMOS) cameras found in nearly all mobile phones. In addition to recording pictures and videos, these devices are sensitive high-speed sampling devices. For instance, a 30 Hz video is making a light intensity measurement every 33.3 ms. Periodic signals in video, such as 50/60 Hz light flicker, can be observed even though this flicker is at frequencies much higher than the sampling rate, as Nyquist-Shannon sampling theory tells us these high frequencies get aliased down to low frequencies.

Temporal information encoded into rolling shutter images allows one to extract various types of information from a single image. Early work measured the relative geometry and motion between camera and object by analyzing the amount of object distortion. Since the primary effect of rolling shutter distortion is degradation in image quality, most work has focused on algorithms to correct distorted images. However, with knowledge of the intrinsic timing of the camera, one can use the images to quantitatively extract information and signals.

Electric network frequency (ENF) analysis is used in media forensics to authenticate video and audio. Extracting ENF signals from video has proved challenging due to the relatively high rate of ENF signals compared to the frame rate of popular commercially available cameras. For most of these cameras, including cameras on personal electronic devices, the ENF is far above the Nyquist limit of the frame-by-frame sampling performed by the camera. However, rolling shutter cameras sequentially expose pixel rows within a frame, effectively allowing the scene to be sampled at a much higher rate. This opens the possibility for the analysis of higher frequency signals, including ENF signals, from rolling shutter video.

Jisoo Choi and Chau-Wai Wong of North Carolina State University use periodic zero-padding to generate predicted values during the idle period of a rolling shutter camera and thus generate an evenly sampled data set. They then use Fourier analysis to extract electrical network frequency signals within the 90-150 Hz range. Hui Su, Adi Hajj-Ahmad, Ravi Garg, and Min Wu from the University of Maryland, College Park use a filter bank model and multirate signal processing theory to analyze the rolling shutter and perform ENF analysis. Both methods successfully analyze video in order to produce spectrograms reflecting the electric network frequency (ENF), however the success of these methods for analyzing signals and their frequencies is only demonstrated for frequencies below 150 Hz, and the methods used to generate data sets can be complex.

SUMMARY OF INVENTION

While some work (discussed above) has been done to exploit rolling shutter cameras in ENF analysis, described herein is a novel process and technique to detect frequencies above those which have been detected before and use our signal extraction technique successfully on only a single frame of rolling shutter video. Exemplary processes allow the extraction of very high frequencies from rolling shutter photographs and video, without aliasing, which are far above the nominal Nyquist limit established for global shutter cameras based upon the same camera frame rate. Applying the Lomb-Scargle periodogram permits a frequency analysis of sources that extend only a few pixel rows in the image.

According to one aspect of the invention, a method of extracting high-frequency temporal information from images or video recorded with a rolling shutter-based imager, the method comprising the steps of acquiring image data using a rolling shutter-based imager; extracting time-domain frequency information from the image based on two or more lines of pixels in the image.

Optionally, the step of extracting includes performing a fast Fourier transform (FFT) on the two or more lines of pixels.

Optionally, the step of extracting includes performing a Lomb-Scargle analysis on the two or more lines of pixels.

Optionally, the method also includes analyzing a plurality of frames and a plurality of sub-regions within the frames for time-based frequency content; and comparing the time-based frequency content of two or more sub-regions for consistency.

Optionally, the method also includes analyzing at least one of a plurality of frames or a plurality of sub-regions within the frames for time-based frequency content; and comparing the time-based frequency content with known frequency data to infer location information for an origination of content of the image data.

The foregoing and other features of the invention are hereinafter described in greater detail with reference to the accompanying drawings.

BRIEF DESCRIPTION OF THE DRAWINGS

FIG. 1 shows a block diagram of an exemplary method.

DETAILED DESCRIPTION

Rolling shutter readout architectures used in CMOS-based image sensors collect imagery by exposing pixels sequentially row-by-row, resulting in a temporal difference between image rows where the time between row exposures depends on row rate and the time needed to read out a frame. Most commercially available, inexpensive cameras, such as those included in smartphones, use rolling shutter readouts.

This should be contrasted against global shutter cameras that start and stop integration on all the pixels simultaneously.

Camera readout rates are determined by the number of rows of the sensor and the full-sized image frame rate that it supports. For instance, an HD-format (1920×1080) sensor capable of recording 30 Hz video reads out 1080 rows in 33.3 ms, resulting in a row rate of at least 32 kHz for a rolling-shutter based sensor. In principle, this suggests that these cameras can detect frequencies as high as 16 kHz without aliasing. In practice, because sampling does not occur instantaneously, the highest frequencies that can be detected are limited by the exposure time used to create the images. As camera formats become larger and larger and support faster readouts, such as 4 k video at 60 frames per second, this row rate will also increase.

With the exception of any image smear, there is no temporal information contained in a global shutter image, so signal extraction can only be done using a series of image frames. Signals are thus sampled in periodically with the samples separated in time by a constant interval, namely the frame time ΔT. With rolling shutter images, each individual image frame contains information sampled at the row time Δt. A series of frames also contains information sampled at the frame time ΔT, where ΔT>>Δt.

In exemplary processes, a target region of the rolling shutter photograph or video containing the signal to be characterized is identified. This can be the entire frame or only a few rows and columns of the image. The photograph or video is converted to grayscale value and each rolling shutter row in the target region is averaged. Each row must now be given a time value. There are two methods to achieve this task. If camera specifications are well-known, then we can calculate the row time based on the pixel row, image width, and horizontal blanking, and can express the time of the sample taken from row m of frame n for video with row time r and frame rate v as:

$$\frac{n}{v} + m \cdot r.$$

We now have a data set of signal brightness sampled at the row rate of the camera. For video footage, a larger data set can be achieved by gathering a similar data set for each frame of video and then combining them into a single set. Once this set is obtained, the Lomb-Scargle algorithms allow the unevenly-sampled data to be analyzed and dominant signal frequencies to be extracted, including frequencies far higher than the Nyquist limit established by the frame rate of the video. For example, using 30 fps video, we correctly identify signals at over 1000 Hz, as well as identify signals from complex waveforms including triangle, square, and combinations of sinusoids.

This methods allows the analysis of signals much higher (10× or more) than the Nyquist limit of the frame-by-frame samples. The method used to generate data is computationally non-intensive compared to past methods used to accomplish the task. The novel use of the Lomb-Scargle algorithms for the data analysis allows the unevenly sampled data characteristic of rolling shutter cameras to be used for analysis without further processing and results in an accurate analysis of the frequencies present in the signal being analyzed. It also allows for the analysis of signals in a variety of waveforms, including various wave shapes and signals composed of several waves of different frequencies.

In summary, and referring to FIG. 1, a method 100 of extracting high-frequency temporal information from images or video recorded with a rolling shutter-based imager is illustrated. A block 110, image data is acquired. At block 120, time-domain frequency information is extracted from the image data based on two or more lines of pixels in the image. Extracting this information may be accomplished by various methods known to those skilled in the art and include a fast Fourier transform (FFT) or a Lomb-Scargle analysis, for example. At block 120, beyond generic frame data, a plurality of frames and a plurality of sub-regions within the frames may be analyzed for time-based frequency content and at block 130, the time-based frequency content of two or more sub-regions are compared for consistency. Alternatively, at block 130, the time-based frequency content may be compared with known frequency data to infer location information for an origination of content of the image data.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method comprising:
   acquiring an image from images or video recorded with a rolling shutter-based imager;
   selecting a target region of the image, the target region comprising a first pixel row and a second pixel row;
   calculating a first row time value based on the first pixel row, a width of the image and a horizontal blanking interval;
   calculating a second row time value based on the second pixel row, the width of the image and the horizontal blanking interval; and
   extracting time-domain frequency information from the first pixel row and second pixel row based on the first and second row time values using a Lomb-Scargle algorithm.

2. The method of claim 1, further comprising the steps of:
   acquiring a second image from the images or video recorded with the rolling shutter-based imager;
   selecting a second target region of the second image, the second target region comprising a third pixel row and a fourth pixel row;
   and assigning a third row time value to the third pixel row and a fourth row time value to the fourth pixel row; and
   wherein the extracting the time-domain frequency information comprises extracting the time-domain frequency information from the first, second, third and fourth pixel rows based on the first, second, third and fourth row time values using the Lomb-Scargle algorithm.

3. The method of claim 2, further comprising comparing the time-domain frequency information of the first target region and second target region for consistency.

4. The method of claim 1, further comprising:
comparing the time-domain frequency information with known frequency data to infer location information for an origination of content of the image.

5. The method of claim 1, further comprising converting the target region to grayscale values.

6. The method of claim 5, further comprising averaging the first and second pixel rows.

7. The method of claim 1, wherein a frame rate of the rolling shutter-based imager is 30 frames per second (fps), and the time-domain frequency information comprises an electric network frequency (ENF) signal over 1000 hertz (Hz).

8. The method of claim 1, further comprising determining a time the image was taken, wherein the time the image was taken is expressed as $$\frac{n}{v} + m \times r,$$

wherein the first pixel row is m, a frame is n, the first row time value is r, and a frame rate of the rolling shutter-based imager is v.

* * * * *